Patented Nov. 2, 1948

2,452,750

UNITED STATES PATENT OFFICE 2,452,750

SUPPLEMENTAL THERAPEUTIC FOOD

Thomas W. Halliday, Los Angeles, and Glenn H. Joseph, Corona, Calif.; said Joseph assignor, by mesne assignments, to said Halliday No Drawing. Application September 3, 1941, Serial No. 409,364

6 Claims. (Cl. 99—132)

This invention relates to a new and useful food product and method for its preparation, said product being particularly useful as a supplemental food having medicinal and therapeutic values.

The source material for the new product is the peel or rind of citrus fruit. As is known, the peel or rind of citrus fruit is divided into two portions; one called the flavedo, which is the outside colored portion of the rind and is that portion in which the oil cells and pigments are situated; the other called the albedo, which is the white, pith-like substance. The major portion of the albedo in the peel is located in the inner portion of the peel. There is not, however, a clear line of demarcation between the flavedo and albedo. The albedo is an extremely rich source of protopectin, the insoluble precursor of pectin, wherein it occurs in association with natural amorphous cellulose and hemicelluloses.

In order, however to utilize the citrus albedo as a supplemental food which can exert its medicinal and therapeutic action in the digestive tract, it should be processed to solubilize the pectin complement and also to remove the oils and pigments. The associated cellulose and hemicelluloses should be subjected to a treatment whereby they are made readily assimilable and non-irritating to the intestinal membranes.

To prepare the citrus peel for use as a supplemental food product, the protopectin is preferably converted into water-soluble pectin without physically removing the pectin from the cellulosic materials with which it is associated as it occurs in nature. The method by which the product of our invention is obtained rests upon the important discovery that it is possible to solubilize the pectin constituents of the citrus peel in situ, that is, without extracting the pectin from its natural cellulosic companions. By so treating the citrus peel there is obtained not only a new product but a product wherein the pectic constituents are caused to remain intimately and naturally dispersed throughout their cellulosic associates. Such a product has many advantages over a mixture wherein the pectin is extracted away from its cellulosic associates, and then subsequently utilized, even if then it should be utilized when mixed with cellulosic material. This latter product is not only more expensive to produce but it embodies all of the disadvantages of mechanical mixtures. The solubilizing of the protopectin is, furthermore, of great importance since by this process the pectin is made available for the promotion of favorable bacterial fermentation in the digestive tract. Also, the decomposition products from this digestive action tend to form gel structures in the intestines in association with the alkaline earth metal materials therein present. These gel structures will in turn act to enmesh bacteria and toxins and to physically remove them. The physical removal of the bacteria by such gel structures is important in that the hydrophilic quality of the gel greatly enhances the movement of the contents of the colon by providing a colloidal body offering a minimum of irritation.

Generally stated, the process of preparing our new product comprises taking preferably freshly cut or comminuted citrus peel and soaking it in a liquid acidic reagent which is a nonsolvent for pectinous substances. Ethyl or isopropyl alcohol, to which a small amount of an acidic material has been added, as, for example, hydrochloric acid, is a suitable reagent. Numerous organic compounds which are liquids at ordinary temperatures and are incapable of dissolving pectin to any appreciable extent are substantially inert as far as concerns any chemical action toward pectin, and are capable of dissolving to an effective extent acids such as hydrochloric acid. This is all well known in this art. Ethyl alcohol and isopropyl alcohol are typical and conveniently available examples. The peel is allowed to remain in contact with the reagent for a time and at a temperature sufficient to solubilize, in situ, any desired portion of the protopectin. The treated peel material, after suitable washings with unacidified alcohol and subsequent drying, will be relatively free from color, flavor, and undesirable constituents. In general, the peel may contain from 30% to 40% by weight of pectic substances, and of the total weight of the treated peel probably 20% to 25% by weight is preferably readily soluble pectin, the remaining pectin being soluble under slightly acidic conditions, such as the acid condition of the stomach. The amount of water-soluble pectin in the treated peel will depend upon the acidity of the treating reagent, as well as upon the temperature at which the treatment is carried out and the length of time of the treatment. After the treated material is dried and ground to a suitable particle size, it is subjected to conditioning or tempering, during which the moisture content of the material is suitably adjusted. The tempered material is then mixed with a lubricant, prior to passing the material through pressure rolls adapted to shear the cellulosic structure of the treated peel.

Accordingly, an object of this invention is to provide and disclose methods and means of producing a new and useful supplemental food product from citrus peel.

Another object of this invention is to provide and disclose methods and means of preparing a new product which may be used as a supplemental food having medicinal and therapeutic properties, in which product the pectinous material is in a readily useable form.

Another object of this invention is to provide and disclose methods and means of preparing a new and useful food product, which food product may be successfully combined with other foods or medicaments, depending upon the use to which the material is to be put.

Other objects, uses, and advantages will appear more fully and at large hereinafter and will be apparent from a description of a preferred process and product embodying the invention, and will present themselves to those skilled in the art in the contemplation and use of the invention.

The following is a specific example of the preparation of the product:

Citrus fruit, as, for example, lemons, are halved and freed of the juice by reaming or pressing. The peel is then rather finely ground, as in a grinder having three-sixteenths inch holes, after which it is then preferably immediately contacted with the treating agent. One hundred and fifty gallons of 90–95% isopropyl alcohol, plus six gallons of hydrochloric acid having a specific gravity of about 1.2, are used for each thousand pounds of the above-mentioned ground peel. The batch is then heated to between 100° and 110° F. and maintained at this temperature for a period of from two to three hours. If a higher temperature is employed the time of the treatment may be materially shortened. At the end of the period of treatment the treating reagent is drained from the peel. For this step it is convenient, although not necessary, to use suction filtration in conjunction with a false-bottom tank, although, obviously, other means of removing the treating reagent may be employed, as, for example, a hydraulic press.

After the peel has been thoroughly drained of the treating reagent it is contacted with a rinse of about one hundred and seventy-five gallons of 90–95% isopropyl alcohol for each thousand pounds of the original peel. This one rinse may be sufficient if the treating reagent has been removed by hydraulic pressure, although if suction filtration is used it may be desirable to employ a second rinse of about the same proportions as the first.

After the second rinse, it is desirable to rinse the peel once more with alcohol containing an amount of an alkaline or buffering material sufficient to raise the pH of the rinse at equilibrium with the rinsed peel to within the range of about pH 2.5 to pH 4.5. This may be done by adding NH$_4$OH. Other alkaline materials and even buffering salts are also effective. The NH$_4$OH is added to the alcohol with agitation.

In practice it has been found desirable to use about one hundred and seventy-five gallons of alcohol, to which has been added about six-tenths to eight-tenths of a gallon of commercial NH$_4$OH. The strength of this commercial reagent is ordinarily 15.1 N. Any additional amount of NH$_4$OH that may be necessary to effect the desired pH of the rinse can be determined by testing the pH of the rinse during the rinsing. This should be done at frequent intervals. These tests may suitably be made by dropping a drop of the rinse on a spot plate and adding to it one drop of thymol blue indicator solution. If the indicator changes from light red to a yellow buff, the rinse is sufficiently alkaline. If, after a period of about 15 minutes, during which the mixture has been stirred thoroughly, the rinse is again tested as described above and shows the yellow buff color, it may be assumed to be sufficiently alkaline. If, however, it shows a pink coloration, more NH$_4$OH needs to be added, though care should be taken that too much is not added so that the pH may not go too high. This condition may be determined by using an indicator solution of brom phenol blue which shows a purple coloration at a pH of about 4.5. Excessive alkalinity may be detected instantly by the development of a dark brown color by the natural plant pigments. Prompt additions of suitable amounts of acid should be made in cases where too much alkali has been added.

The principal purpose of the alkaline or buffering rinse is to reduce the residual acidity of the pectin to a point where the pectin will not be injured by the acidity during subsequent steps of the process.

After equilibrium has about been reached between the acid peel and the alkaline rinse and the pH is found to lie within the range of about pH 2.5 to 4.5, and preferably at about pH 3.5, the alcohol may be separated from the peel and the peel dried by any suitable means. The dried peel should be then preferably ground to about 20 to 50 mesh, in order to facilitate the tempering or conditioning step and to have it feed into the shearing rolls in a satisfactory manner.

In order to temper or condition the dried, ground peel, the total moisture content of the peel is adjusted to within a range of from between 15 to 35 per cent with a probable optimum range of from between 20 to 30 per cent. The moisture content of the dried peel may be adjusted to within this range in any suitable manner. It has been found satisfactory to calculate the amount of water required to bring the moisture content of the peel to within the desired range and then atomize this amount of water into a closed space, within which the peel is circulated. Also, it seems necessary to add a lubricating material to the conditioned peel. The purpose of the lubricating material is to keep the sensibly moist peel from sticking to the shearing rolls. Most any of the vegetable oils which may suitably be used as a food, as, for example, peanut, sesame, or cottonseed oil, may be satisfactorily used as a lubricant. Also, mineral oil such as the heavy white edible mineral oil is satisfactory. The lubricating oil is added to the treated peel in an amount of from about one and one-half per cent to six per cent by weight of the conditioned peel, with a probable optimum of about three per cent. If too much lubricant is used difficulty may be encountered in feeding the peel onto the shearing rolls. The lubricating material may be emulsified with the water to be used in conditioning the peel or it may be atomized over the conditioned peel. The peel is now ready to have its cellulosic components ruptured, or disrupted, or sheared, and stretched. This is suitably accomplished by means of an apparatus described in U. S. Patent 2,200,774. The apparatus therein described has been found to be eminently satisfactory for the purpose of shearing the cellulosic structure of the peel and forming the peel into thin, tissue-like sheets or flakes. In general, the apparatus includes a series of three smooth cylindrical rolls, spaced so that their peripheries are within approximately one one-thousandth of an inch of each other. The rolls are driven at different speeds so that as the conditioned peel is fed onto the rolls it is taken from the slower roll by the faster roll and transferred in this manner through the series of rolls, all of which is clearly explained in the patent above referred to. The flaked product, after coming from the shearing rolls, is first allowed to cool and is then ready to be packaged for use.

It is to be noted that as the peel passes through the series of rolls, the temperature of the rolls increases, due to friction, to about 200° F. As a general rule, the hotter the rolls become during the operation, the higher the moisture content of the peel should be to prevent excessive drop-off of the peel flakes from between the rolls. However, if the moisture content is too high, then the flakes will tend to stick to the rolls and the scraping knife. It is also to be kept in mind that the temperature of the rolls must be kept below the point where thermal disintegration of the product occurs.

As a modification of the tempering step, we have found that if the treated peel is to be immediately flaked, it may be tempered by taking it from the last alcohol rinse and drying it to within the moisture range of from 15% to 35%, and subsequently mixing the lubricating substance with the peel. Since a considerable amount of the wetness of the peel in this instance will be due to residual alcohol, it may be desirable to effect a saving of this alcohol by surrounding the shearing rolls with an alcohol recovery system.

It is obvious from what has been said hereinbefore that the tempering of the peel may be effected either by adding controlled amounts of water to dried treated peel or by drying the treated peel to within the tempering moisture range.

It will be obvious from what has been said that the shearing action of the flaking process will leave the pectinous material, the cellulose, and the hemicelluloses in substantially their original interrelationship, one with another, except that this interrelationship will have undergone a considerable spatial displacement due to the reduction of the particles to very thin bodies and to the very considerable increase in the area and the cell structure and the fibers will have become disrupted. There are, as has been said above, distinct advantages for a product of this type for the pectin, the celluloses, and the hemicelluloses act in a sense as dispersants for each other, in that they occur in their natural intermingled relationship and thus each, in the flake, is relatively separated by the others from like material. This has the two-fold advantage that the pectin is much more exposed to the action of the liquids of the alimentary tract, and the celluloses and hemicelluloses are so dispersed that no harmful agglomeration of these with attendant irritation can occur.

If it is desired to augment this supplemental food product with other food substances, these may be mixed with the treated peel prior to the tempering step or elsewhere in the process. Dehydrated vegetables such as carrots, spinach, etc., may be mixed with the peel prior to tempering and shearing and the mixture passed through the shearing rolls. Psyllium seed or agar, etc., may also be combined with the treated peel prior to shearing. Also, it will be readily seen that innumerable medicinal substances may be mixed with the treated peel, depending on the uses to which the material is to be put.

The sheared product will readily disperse in aqueous media upon simple slight stirring or shaking, and may be used as a therapeutic food directly, in this manner. It may desirably be commingled with other food products, to which it will add its own characteristic and beneficial properties.

Having thus described our invention in such clear, concise, and exact terms as to enable others skilled in the art to perform the same, we claim as our invention and desire to secure by Letters Patent the following:

1. A process for the preparation of a supplemental food product comprising treating a pectinous-cellulosic material with a liquid acidic reagent which is a non-solvent for pectin and which is adapted to solubilize pectin, thereby solubilizing in situ a major proportion of the pectinous component of said material, tempering the so-treated material to a predetermined moisture content, mixing therewith an oleaginous substance as a lubricating material to improve the subsequent shearing of the treated material, and finally simultaneously shearing and flaking the material to form very thin flakes wherein the cellulosic fibers have been disrupted and made readily hydratable.

2. A process for the preparation of a supplemental food product comprising treating a pectinous-cellulosic material with a liquid-acidic reagent which is a non-solvent for pectin and which is adapted to solubilize pectin, thereby solubilizing a major proportion of the pectinous component of said material in situ, adjusting the pH of the treated pectinous-cellulosic material to within a range of about pH 2.5 to 4.5, tempering the said treated material, mixing therewith an oleaginous substance as a lubricating material to improve the subsequent shearing of the treated material, and simultaneously shearing and flaking the material to form very thin flakes wherein the fibers have been materially disrupted and made readily hydratable.

3. A process for the preparation of a supplemental food product comprising treating a pectinous-cellulosic material with a liquid reagent which is a non-solvent for pectin and which is adapted to solubilize pectin, thereby solubilizing a major proportion of the pectinous component of said material in situ, tempering the said treated material, mixing therewith an oleaginous substance as a lubricating material to improve the subsequent shearing of the treated material, and finally simultaneously shearing and flaking the material to form very thin, fiber-disrupted flakes wherein the cellulosic constituents thereof are in a readily hydratable condition.

4. A process for the preparation of a supplemental food product, comprising treating pectinous-cellulosic material with acidified alcohol, thereby solubilizing in situ a major proportion of the pectinous component of said material, adjusting the pH of the so-treated pectinous material to within a range of about 2.5 to 4.5, tempering the said treated material by adjusting the total moisture content of the peel to within a range of from about 15% to 35% moisture, mixing therewith an oleaginous substance as a lubricating material to improve the subsequent shearing of the treated material in an amount of from about 1½% to 6% by weight of the tempered material, and finally simultaneously shearing and flaking the material to form very thin flakes wherein the fibers have been materially disrupted and made readily hydratable.

5. A process for the preparation of a supplemental food product comprising solubilizing in situ a major proportion of the pectinous component of a pectinous source material, tempering said solubilized material, mixing therewith an oleaginous substance as a lubricating material to improve the subsequent shearing of the treated material, and finally simultaneously shearing and flaking the so treated material to form very thin fiber-disrupted flakes containing soluble pectin and readily hydratable cellulose.

6. A process for the preparation of a supplemental food product comprising treating pectinous-cellulosic material with acidified alcohol, thereby rendering water soluble a major proportion of the pectinous component of said material, tempering the said treated material, mixing therewith an oleaginous substance as a lubricating material to improve the subsequent shearing of the treated material, and finally simultaneously shearing and flaking the material to form very thin fiber-disrupted flakes containing soluble pectin and readily hydratable cellulose.

THOMAS W. HALLIDAY.
GLENN H. JOSEPH.

REFERENCES CITED

The following references are of record in the file of this patent:

UNITED STATES PATENTS

| Number | Name | Date |
|---|---|---|
| 1,393,660 | Beylik | Oct. 11, 1921 |
| 1,816,817 | Bialos | Aug. 4, 1931 |
| 1,838,949 | Leo | Dec. 24, 1931 |
| 2,022,471 | Leo | Nov. 26, 1935 |
| 2,038,582 | Leo | Apr. 28, 1936 |
| 2,043,204 | Spalding | June 2, 1936 |
| 2,075,846 | Halliday | Apr. 6, 1937 |
| 2,095,617 | Rooker | Oct. 12, 1937 |
| 2,139,139 | Tompkins | Dec. 6, 1938 |
| 2,145,016 | Spalding | Jan. 24, 1939 |

OTHER REFERENCES

Elwell, William E., "Pectin," page 28, published by State of Washington. January 1939.